(12) United States Patent
Zhou et al.

(10) Patent No.: US 12,149,997 B2
(45) Date of Patent: Nov. 19, 2024

(54) RELAY USER EQUIPMENT SWITCHING AFTER BEAM FAILURE

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/656,493

(22) Filed: Mar. 25, 2022

(65) Prior Publication Data

US 2023/0308970 A1  Sep. 28, 2023

(51) Int. Cl.
| | |
|---|---|
| *H04W 36/00* | (2009.01) |
| *H04B 7/155* | (2006.01) |
| *H04W 8/00* | (2009.01) |
| *H04W 36/06* | (2009.01) |
| *H04W 36/30* | (2009.01) |
| *H04W 76/19* | (2018.01) |
| *H04W 88/04* | (2009.01) |

(52) U.S. Cl.
CPC ........ *H04W 36/03* (2018.08); *H04B 7/15557* (2013.01); *H04W 8/005* (2013.01); *H04W 36/06* (2013.01); *H04W 36/305* (2018.08); *H04W 76/19* (2018.02); *H04W 88/04* (2013.01)

(58) Field of Classification Search
CPC ..... H04W 36/03; H04W 76/19; H04W 8/005; H04W 36/06; H04W 36/305; H04B 7/15557

See application file for complete search history.

(56) References Cited

U.S. PATENT DOCUMENTS

| | | | |
|---|---|---|---|
| 2020/0337115 A1* | 10/2020 | Qin | H04W 72/21 |
| 2022/0030493 A1* | 1/2022 | Hong | H04L 1/1896 |
| 2023/0127924 A1* | 4/2023 | Srinivasan | H04W 28/0268 370/328 |
| 2023/0328807 A1* | 10/2023 | Wu | H04W 76/10 370/329 |

* cited by examiner

*Primary Examiner* — Derrick V Rose
(74) *Attorney, Agent, or Firm* — QUALCOMM Incorporated

(57) ABSTRACT

Various aspects of the present disclosure generally relate to wireless communication. In some aspects, a relay user equipment (UE) may detect a beam failure on an access link. The relay UE may transmit, to a network entity and responsive to the beam failure, information indicating that a UE, that uses the relay UE for relaying communications with the network entity, is to use a different relay UE. Numerous other aspects are described.

30 Claims, 11 Drawing Sheets

RELAY USER EQUIPMENT SWITCHING AFTER BEAM FAILURE

FIELD OF THE DISCLOSURE

Aspects of the present disclosure generally relate to wireless communication and to techniques and apparatuses for relay user equipment switching after beam failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
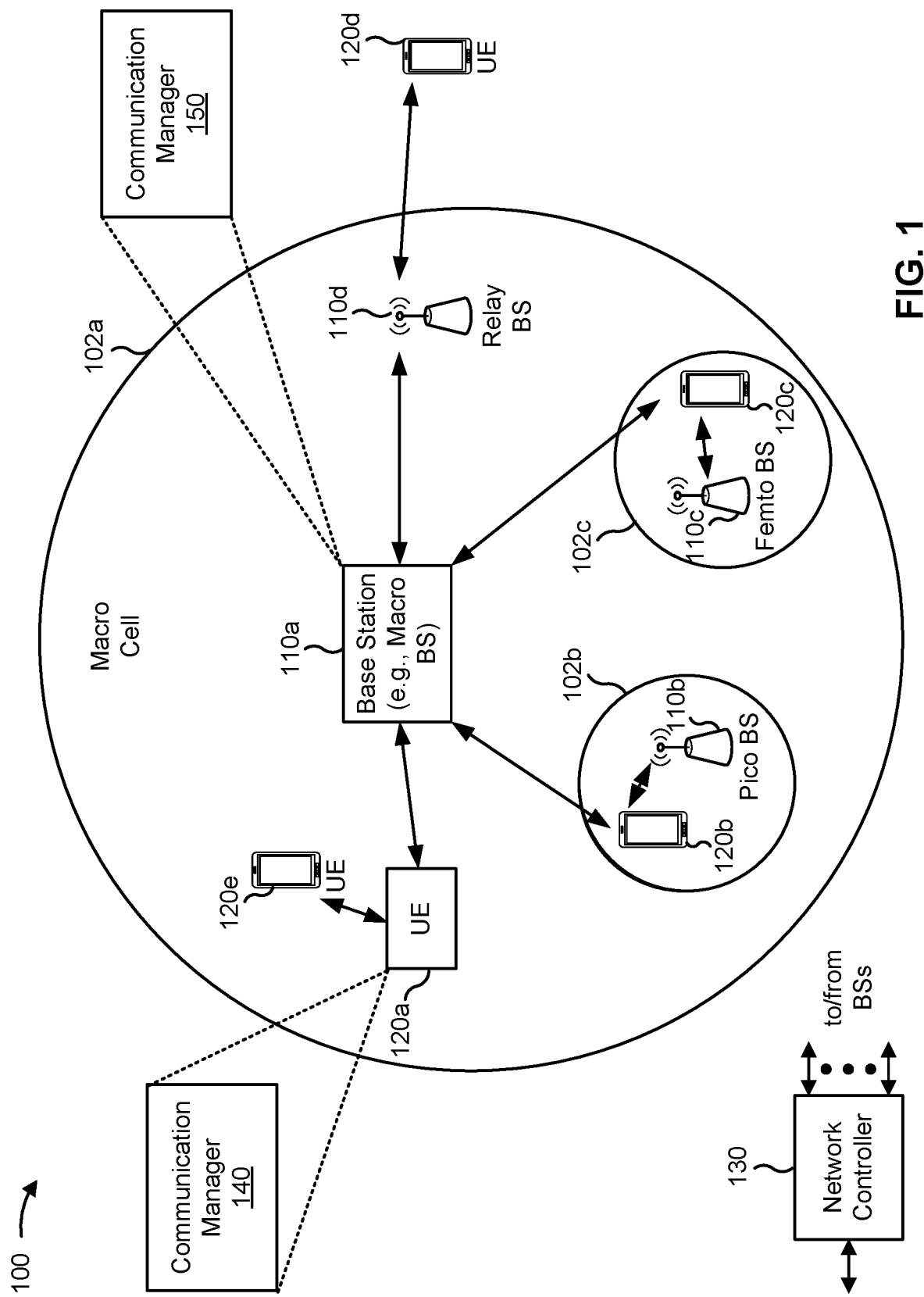
FIG. 1 is a diagram illustrating an example of a wireless network, in accordance with the present disclosure.

Some aspects described herein relate to a method of wireless communication performed by an apparatus of a relay user equipment (UE). The method may include detecting a beam failure on an access link. The method may include transmitting, to a network entity and responsive to the beam failure, information indicating that a UE, that uses the relay UE for relaying communications with the network entity, is to use a different relay UE.

Some aspects described herein relate to a method of wireless communication performed by an apparatus of a network entity. The method may include receiving information, transmitted by a relay UE, indicating that a UE, that uses the relay UE for relaying communications, is to use a different relay UE. The method may include transmitting, responsive to the information, an indication that relaying for the UE is to switch from the relay UE to the different relay UE.

Some aspects described herein relate to an apparatus for wireless communication at a relay UE. The apparatus may include a memory and one or more processors coupled to the memory. The one or more processors may be configured to detect a beam failure on an access link. The one or more processors may be configured to transmit, to a network entity and responsive to the beam failure, information indicating that a UE, that uses the relay UE for relaying communications with the network entity, is to use a different relay UE.

Some aspects described herein relate to an apparatus for wireless communication at a network entity. The apparatus may include a memory and one or more processors coupled to the memory. The one or more processors may be configured to receive information, transmitted by a relay UE, indicating that a UE, that uses the relay UE for relaying communications, is to use a different relay UE. The one or more processors may be configured to transmit, responsive to the information, an indication that relaying for the UE is to switch from the relay UE to the different relay UE.

Some aspects described herein relate to a non-transitory computer-readable medium that stores a set of instructions for wireless communication by a relay UE. The set of instructions, when executed by one or more processors of the relay UE, may cause the relay UE to detect a beam failure on an access link. The set of instructions, when executed by one or more processors of the relay UE, may cause the relay UE to transmit, to a network entity and responsive to the beam failure, information indicating that a UE, that uses the relay UE for relaying communications with the network entity, is to use a different relay UE.

Some aspects described herein relate to a non-transitory computer-readable medium that stores a set of instructions for wireless communication by a network entity. The set of instructions, when executed by one or more processors of the network entity, may cause the network entity to receive information, transmitted by a relay UE, indicating that a UE, that uses the relay UE for relaying communications, is to use a different relay UE. The set of instructions, when executed by one or more processors of the network entity, may cause the network entity to transmit, responsive to the information, an indication that relaying for the UE is to switch from the relay UE to the different relay UE.

Some aspects described herein relate to an apparatus for wireless communication. The apparatus may include means for detecting a beam failure on an access link. The apparatus may include means for transmitting, to a network entity and responsive to the beam failure, information indicating that a UE, that uses the apparatus for relaying communications with the network entity, is to use a different relay UE.

Some aspects described herein relate to an apparatus for wireless communication. The apparatus may include means for receiving information, transmitted by a relay UE, indicating that a UE, that uses the relay UE for relaying communications, is to use a different relay UE. The apparatus may include means for transmitting, responsive to the information, an indication that relaying for the UE is to switch from the relay UE to the different relay UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a relay UE (e.g., a UE 120) may include a communication manager 140. As described in more detail elsewhere herein, the communication manager 140 may detect a beam failure on an access link; and transmit, to a network entity and responsive to the beam failure, information indicating that a UE, that uses the relay UE for relaying communications with the network entity, is to use a different relay UE. Additionally, or alternatively, the communication manager 140 may perform one or more other operations described herein.

In some aspects, a network entity (e.g., a base station 110) may include a communication manager 150. As described in more detail elsewhere herein, the communication manager 150 may receive information, transmitted by a relay UE, indicating that a UE, that uses the relay UE for relaying communications, is to use a different relay UE; and transmit, responsive to the information, an indication that relaying for the UE is to switch from the relay UE to the different relay UE. Additionally, or alternatively, the communication manager 150 may perform one or more other operations described herein.

As indicated above, FIG. 1 is provided as an example. Other examples may differ from what is described with regard to FIG. 1.

Figure 2:
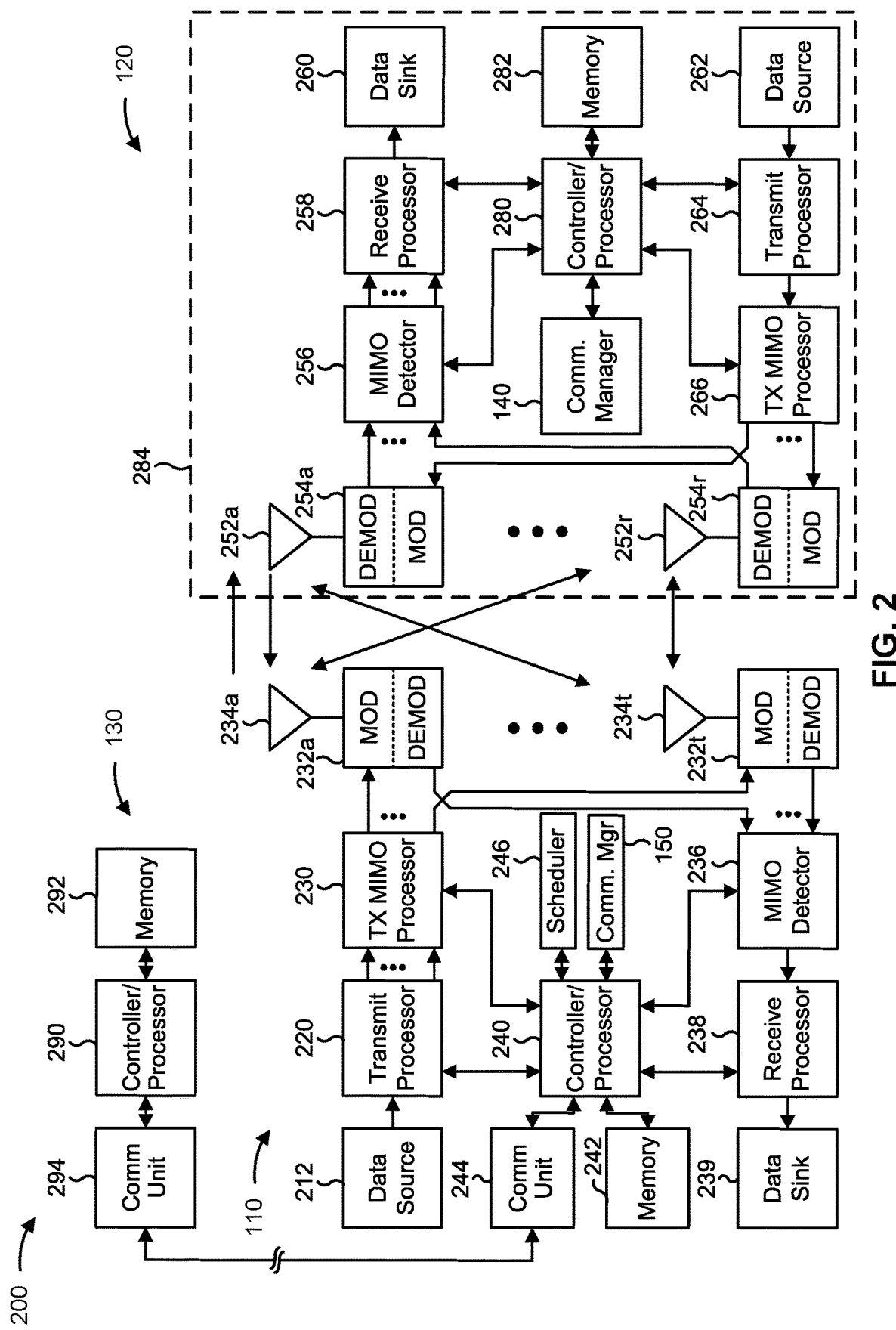
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with relay UE switching after beam failure, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a relay UE (e.g., a UE 120) includes means for detecting a beam failure on an access link; and/or means for transmitting, to a network entity and responsive to the beam failure, information indicating that a UE, that uses the relay UE for relaying communications with the network entity, is to use a different relay UE. The means for the relay UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a base station 110) includes means for receiving information, transmitted by a relay UE, indicating that a UE, that uses the relay UE for relaying communications, is to use a different relay UE; and/or means for transmitting, responsive to the information, an indication that relaying for the UE is to switch from the relay UE to the different relay UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
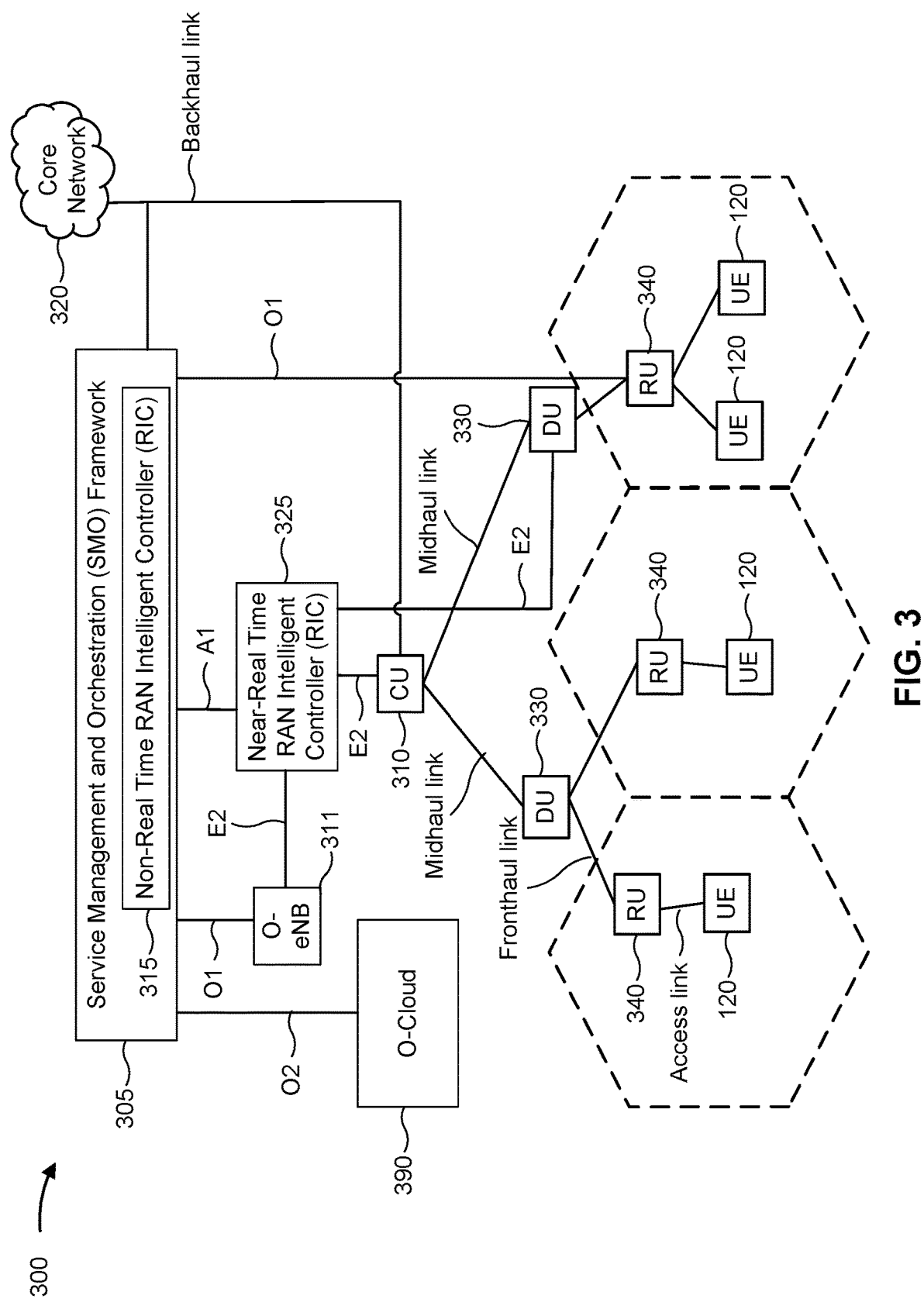
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
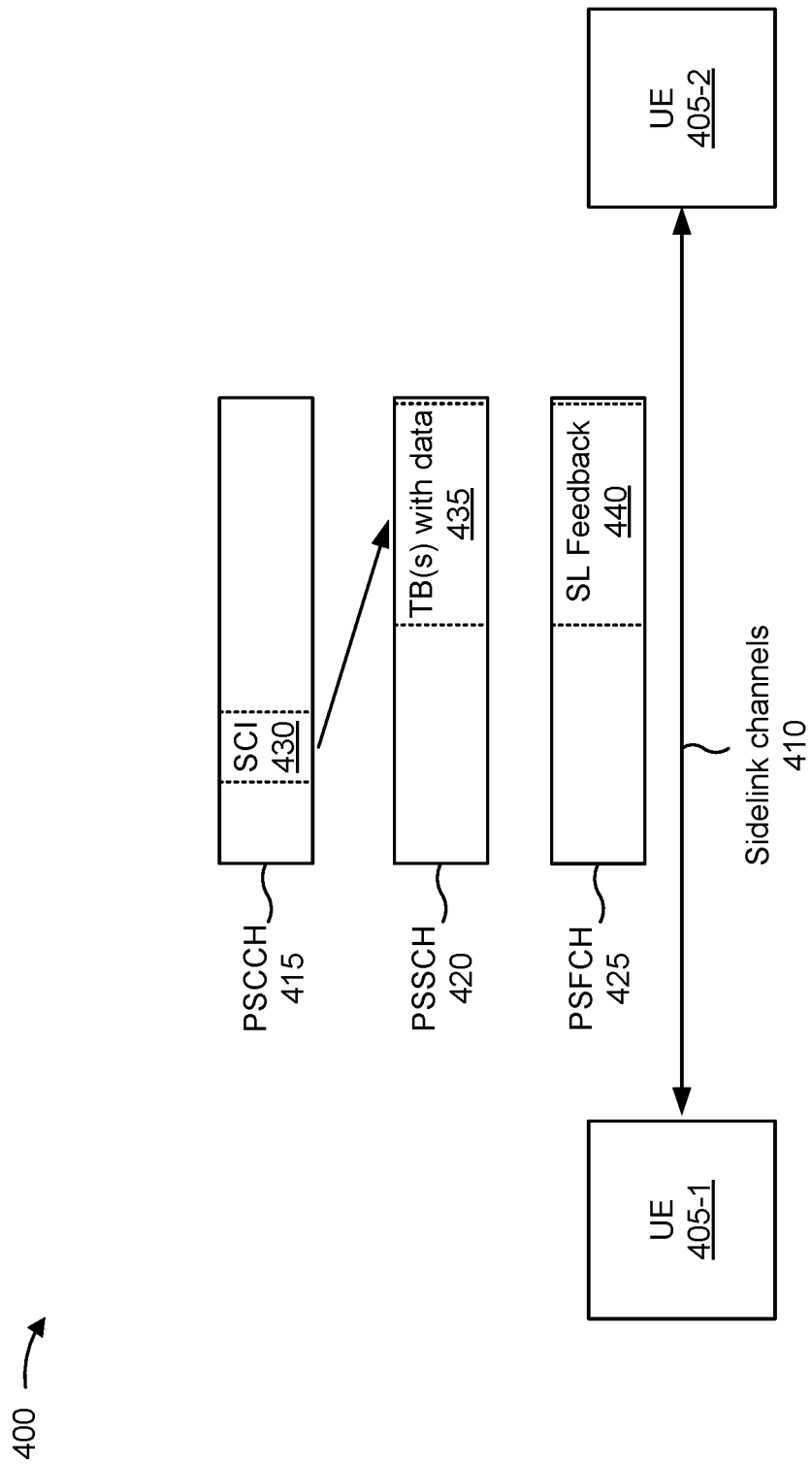
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARD) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in an RRC message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some examples, the first UE 405-1 may provide relaying of communications of the second UE 405-2. For example, the first UE 405-1 may relay uplink communications of the second UE 405-2 to a base station 110. As another example, the first UE 405-1 may relay downlink communications of a base station 110 to the second UE 405-2.

As indicated above, FIG. 4 is provided as an example. Other examples may differ from what is described with respect to FIG. 4.

Figure 5:
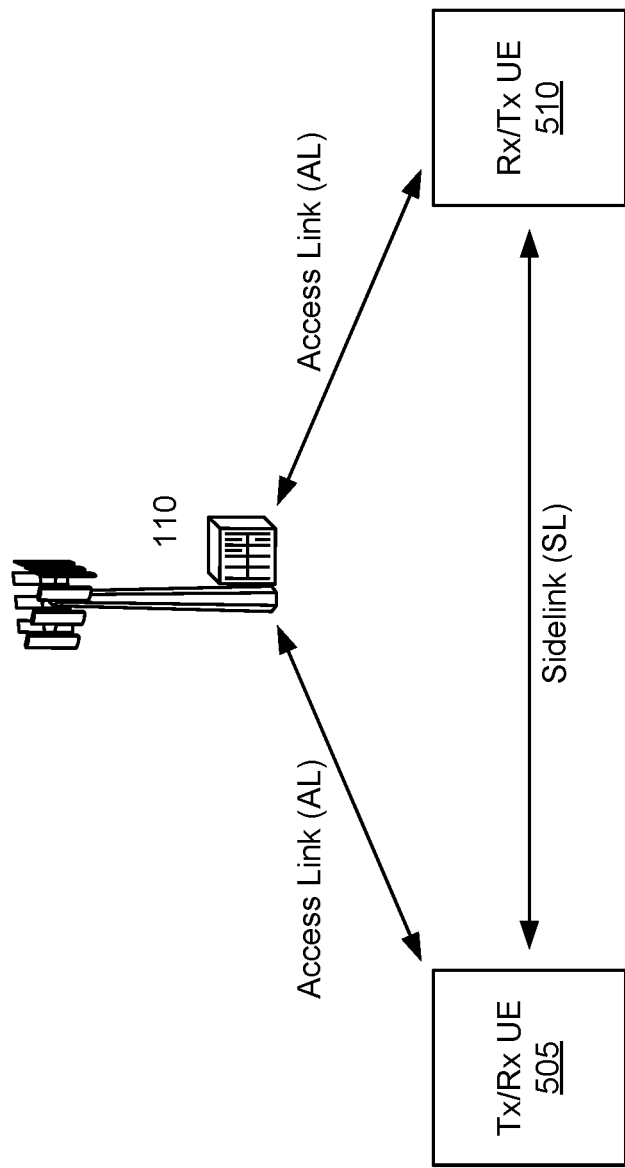
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
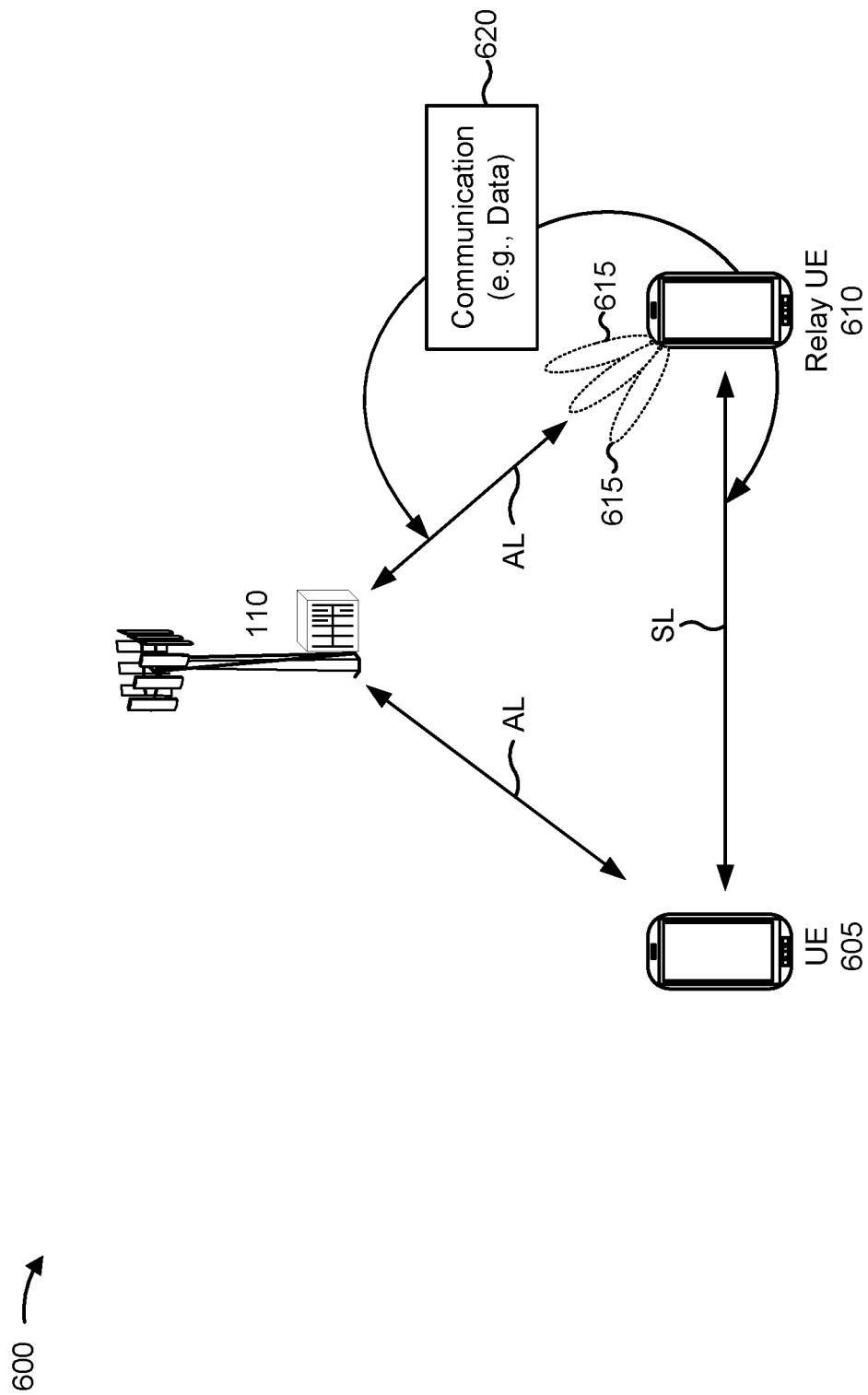
FIG. 6 is a diagram illustrating an example of sidelink relaying, in accordance with the present disclosure.

FIG. 6 is a diagram illustrating an example 600 of sidelink relaying, in accordance with the present disclosure. FIG. 6 shows communication between a UE 605, a relay UE 610, and a base station 110. The communication between the UE 605, the relay UE 610, and the base station 110 involves a multi-path scenario.

As shown in FIG. 6, a UE 605 (e.g., a source UE) may be connected to, and may communicate with, a relay UE 610 on a sidelink (e.g., via a PC5 interface), as described herein. In some examples, communications on the sidelink may be scheduled using Mode 1 scheduling, as described herein. Moreover, the UE 605 may be connected to, and may communicate with, a base station 110 on an access link (e.g., via a Uu interface), as described herein. Similarly, the relay UE 610 may be connected to, and may communicate with, the base station 110 on an access link (e.g., via a Uu interface), as described herein. As further shown in FIG. 6, the relay UE 610 may be connected with the base station 110 on the access link using multiple beams 615. One or more data communications 620 between the base station 110 and the UE 605 may be relayed via the relay UE 610. For example, the relay UE 610 may receive a downlink communication from the base station 110 on the access link, and the relay UE 610 may relay the downlink communication to the UE 605 on the sidelink. As another example, the relay UE 610 may receive an uplink communication from the UE 605 on the sidelink, and the relay UE 610 may relay the uplink communication to the base station 110 on the access link.

In some cases, the access link between the relay UE 610 and the base station 110 may weaken. For example, a current beam 615 that is being used on the access link of the relay UE 610 may experience a problem (e.g., beam failure, beam blocking, or the like), and the relay UE 610 may need to perform beam failure recovery (BFR) for the access link. However, when the UE 605 is connected to the relay UE 610 for data relaying to/from the base station 110, the relaying may rely on a good connection between the relay UE 610 and the base station 110 (e.g., particularly when the serving traffic has a high QoS requirement).

Some techniques and apparatuses described herein provide for relay reselection and resuming when a relay UE, that relays communications between a UE and a network entity, experiences beam failure on an access link. In some aspects, the relay UE may detect the beam failure, and the relay UE may transmit, to the network entity and responsive to the beam failure, information indicating that the UE is to use a different relay UE. For example, the information may indicate that the UE should use, or must use, a different relay UE. In some aspects, the network entity may transmit, responsive to the information, an indication that relaying for the UE is to switch from the relay UE to a different relay UE. The indication may be for the UE and/or the different relay UE. While the different relay UE provides relaying of communications between the UE and the network entity, the relay UE may perform BFR for the access link.

In this way, relaying quality for communications between the UE and the network entity may be seamlessly maintained (e.g., via the different relay UE) while the relay UE performs BFR to recover the access link connection. Accordingly, the techniques and apparatuses described herein improve the performance of communications of the UE, reduce failed communications, or the like.

As indicated above, FIG. 6 is provided as an example. Other examples may differ from what is described with respect to FIG. 6.

Figure 7:
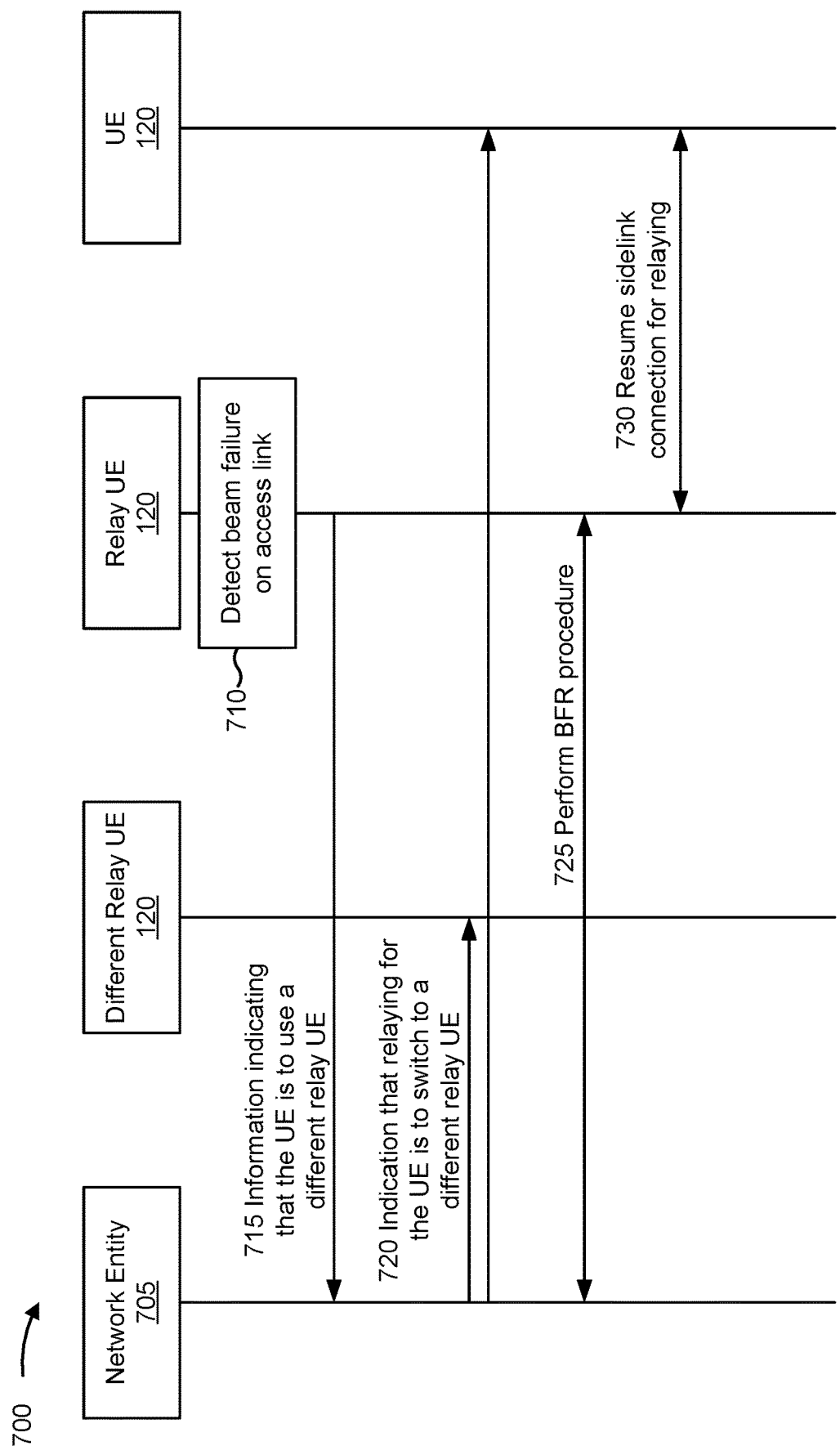
FIG. 7 is a diagram illustrating an example associated with relay UE switching, in accordance with the present disclosure.

FIG. 7 is a diagram illustrating an example 700 associated with relay UE switching, in accordance with the present disclosure. As shown in FIG. 7, example 700 includes communication between a network entity 705, a relay UE 120, and a UE 120 (e.g., a source UE). In some aspects, the network entity 705, the relay UE 120, and the UE 120 may be included in a wireless network, such as wireless network 100. The network entity 705 may be, or may include, a base station 110 or one or more components of a disaggregated base station, such as a CU 310, a DU 330, an RU 340, or the like.

The UE 120 may be connected to, and may communicate with, the relay UE 120 on a sidelink (e.g., via a PC5 interface), as described herein. The UE 120 may be connected to, and may communicate with, the network entity 705 (or another network entity in communication with the network entity 705) on an access link (e.g., via a Uu interface), as described herein. The relay UE 120 may be connected to, and may communicate with, the network entity 705 (or the other network entity) on an access link (e.g., via a Uu interface), as described herein. The relay UE 120 may be connected with the network entity 705 (or the other network entity) on the access link using multiple beams, as described herein.

One or more data communications between the network entity 705 and the UE 120 may be relayed via the relay UE 120. For example, the relay UE 120 may receive a downlink communication from the network entity 705 on the access link, and the relay UE 120 may relay the downlink communication to the UE 120 on the sidelink. As another example, the relay UE 120 may receive an uplink communication from the UE 120 on the sidelink, and the relay UE 120 may relay the uplink communication to the network entity 705 on the access link. While the description herein is described in terms of the relay UE 120 relaying communications of the UE 120, in some cases, the UE 120 may also act as a relay UE for another UE (e.g., the relay UE 120) and/or the relay UE 120 may have communications relayed by another UE (e.g., the UE 120).

In some aspects, sidelink communications may be scheduled using Mode 1 scheduling, as described herein. Accordingly, a plurality of UEs (e.g., the UE 120, the relay UE 120, and/or one or more other UEs) may report sidelink beam information, sidelink measurement information, or the like, and the network entity 705 may receive the reports. Thus, the network entity 705 may obtain and/or store information relating to sidelink communication. The information relating to sidelink communication may include information relating to sidelink beam pairs. The information relating to sidelink communication may include information indicating a pool of source UEs (e.g., UEs that are to use another UE for sidelink relaying) and/or a pool of relay UEs (e.g., UEs that are to perform sidelink relaying for another UE). The information relating to sidelink communication may include information indicating spatial relationships between beams of source UEs and relay UEs. The information relating to sidelink communication may include information relating to sidelink beams that are being monitored by one or more UEs, candidate sidelink beams for one or more UEs, or the like.

Initially, the UE 120 may use the relay UE 120 for relaying communications (e.g., uplink communications and/or downlink communications) with the network entity 705. That is, the relay UE 120 may provide relaying for the UE 120. As shown by reference number 710, the relay UE 120 may detect a beam failure on the access link of the relay UE 120 (e.g., with the network entity 705 or the other network entity in communication with the network entity 705). For example, the relay UE 120 may perform a Layer 1 (L1) measurement, such as an RSRP measurement, an RSRQ measurement, a signal-to-interference-and-noise ratio (SINR) measurement, or the like, of reference signals for a beam set associated with the access link, and the relay UE 120 may determine that the L1 measurement (e.g., indicating a radio link quality) fails to satisfy a measurement threshold. Based at least in part on determining that the L1 measurement fails to satisfy the measurement threshold, the relay UE 120 may initiate a beam failure detection (BFD) timer and may increment a beam failure indication (BFI) count. If the BFI count satisfies a count threshold before the expiration of the BFD timer, then the UE 120 may determine the beam failure.

As shown by reference number 715, responsive to the beam failure, the relay UE 120 may transmit, and the network entity 705 may receive, information indicating that the UE 120 (e.g., that currently uses the relay UE 120 for relaying communications) is to use a different relay UE. In some aspects, the relay UE 120 may transmit the information in a BFR message (e.g., a BFR medium access control control element (MAC-CE), or an enhanced BFR MAC-CE). The relay UE 120 may transmit the BFR message as part of a BFR procedure. For example, responsive to detecting the beam failure, the relay UE 120 may transmit a request for an uplink resource, receive an uplink grant for the uplink resource, and transmit the BFR message using the uplink resource. The BFR message may also provide an indication of the beam failure and an indication of a candidate beam for BFR. In some aspects, the relay UE 120 may transmit the information in a MAC-CE or in uplink control information (e.g., separately from the BFR procedure).

In some aspects, the information may further indicate an identity of the UE 120 (e.g., using a UE identifier). For example, the information may include source UE identity information for the UE 120. In some aspects, the information may further indicate a recommendation of a different relay UE (e.g., using a UE identifier) for the UE 120 (e.g., a recommendation of a new relay UE for the UE 120 that is preferred by the relay UE 120). For example, the relay UE 120 may determine the recommendation of the different relay UE based at least in part on measurements (e.g., beam measurements), relating to neighboring UEs, taken by the relay UE 120.

As shown by reference number 720, responsive to the information, the network entity 705 may transmit an indication that relaying for the UE 120 is to switch from the relay UE 120 to a different relay UE 120. In some aspects, the different relay UE 120 that is indicated by the network entity 705 may be the different relay UE that is recommended by the relay UE 120. In some aspects, the different relay UE 120 that is indicated by the network entity 705 may be selected by the network entity 705 based at least in part on sidelink measurement reporting from one or more UEs (e.g., the UE 120, the relay UE 120, the different relay UE 120, and/or one or more other UEs). For example, the network entity 705 may determine that the UE 120 is to switch to using the different relay UE 120 based at least in part on a sidelink measurement record between cooperating UEs.

In some aspects, the UE 120 may receive the indication that relaying for the UE 120 is to switch from the relay UE 120 to the different relay UE 120. Additionally, or alternatively, the different relay UE 120 may receive the indication that relaying for the UE 120 is to switch from the relay UE 120 to the different relay UE 120 (e.g., the indication may indicate that the different relay UE 120 is to prepare for relaying communications for the UE 120). In some aspects, the network entity 705 may transmit the indication (e.g., to the UE 120 and/or to the different relay UE 120) in a MAC-CE or in downlink control information.

Based at least in part on the indication, the UE 120 may use the different relay UE 120 for relaying of communications between the UE 120 and the network entity 705. For example, based at least in part on the indication, the UE 120 and the different relay UE 120 may establish a sidelink connection for relaying communications between the UE 120 and the network entity 705. In this way, interruptions to relayed communications of the UE 120, that may occur due to the beam failure of the relay UE 120, may be reduced or eliminated. The different relay UE 120 may relay communications of the UE 120 in a similar manner as described herein for the relay UE 120.

In some aspects, the indication may further indicate a timer (e.g., indicate a time length of the timer) for switching relaying for the UE 120 from the different relay UE 120 back to the relay UE 120. Here, the network entity 705 also may transmit, and the relay UE 120 may receive, an additional indication of the timer for switching relaying for the UE 120 from the different relay UE 120 back to the relay UE 120. In some aspects, the network entity 705 may transmit the additional indication in a BFR response message (e.g., that is in response to the BFR message, described herein). The BFR response message may also indicate an uplink grant for a new transmission of the relay UE 120. In some aspects, a time length of the timer may be based at least in part on (e.g., the network entity 705 may determine the time length based at least in part on) a processing time for BFR on the access link of the relay UE 120 and/or a propagation delay associated with the access link of the relay UE 120, among other examples.

As shown by reference number 725, the relay UE 120 and the network entity 705 may perform a BFR procedure to recover the access link connection of the relay UE 120. For example, the relay UE 120 may perform one or more operations of the BFR procedure for the access link (e.g., transmitting a BFR request, selecting a candidate beam, transmitting a BFR message, performing a random access procedure, or the like, as described herein), and/or the network entity 705 may perform one or more operations of the BFR procedure for the access link (e.g., transmitting an uplink grant for the BFR message, transmitting a BFR response message, performing a random access procedure, or the like, as described herein). The BFR procedure may be performed while relaying for the UE 120 is being handled by the different relay UE 120.

As shown by reference number 730, the UE 120 and the relay UE 120 may resume a sidelink connection for relaying communications of the UE 120. In some aspects, at an expiration of the timer, the relay UE 120 may resume a sidelink connection with the UE 120 for relaying communications of the UE 120. In other words, at the expiration of the timer, the UE 120 may switch from the different relay UE 120 back to the relay UE 120 for relaying.

In some aspects, the timer for switching relaying for the UE 120 from the different relay UE 120 back to the relay UE 120 may not be used. For example, the UE 120 may maintain a sidelink connection for relaying with the different relay UE 120 unless the network entity 705 indicates a change to relaying for the UE 120. In some aspects, the network entity 705 may transmit an indication that relaying for the UE 120 is to switch from the different relay UE 120 back to the relay UE 120. In some aspects, the UE 120 may receive the indication that relaying for the UE 120 is to switch from the different relay UE 120 back to the relay UE 120. Additionally, or alternatively, the relay UE 120 may receive the indication that relaying for the UE 120 is to switch from the different relay UE 120 back to the relay UE 120. In some aspects, the network entity 705 may transmit the indication (e.g., to the UE 120 and/or to the relay UE 120) in a MAC-CE or in downlink control information. In some aspects, the network entity 705 may transmit the indication at a completion of the BFR procedure for the relay UE 120. In some aspects, the indication may further indicate an update to one or more sidelink beams that are to be used by the UE 120 and the relay UE 120.

In some aspects, the network entity 705 may transmit, and one or more UEs (e.g., the UE 120, the relay UE 120, the different relay UE 120, and/or one or more other UEs) may receive a configuration (e.g., an RRC configuration) relating to relay UE switching after beam failure. For example, the configuration may indicate a pool of candidate relay UEs for sidelink relaying for a UE. As another example, the configuration may indicate a content for an access link BFR report (e.g., whether the BFR report may indicate that relaying for a UE is to be switched to a different relay UE, whether the BFR report may indicate the identity of the UE, whether the BFR report may indicate a recommendation of the different relay UE, or the like, as described herein). As a further example, the configuration may indicate a time value for the timer described herein. In some aspects, the network entity 705 may configure, for a UE, multiple options for the content for the BFR report and/or multiple options for the time value. Here, the network entity 705 may indicate to the UE a particular configuration for the content and/or for the time value that is to be used by the UE (e.g., the network entity 705 may indicate that the UE is to switch to using the particular configuration). The indication may be in a MAC-CE or in downlink control information. The network entity 705 may indicate that the UE is to switch to the particular configuration based at least in part on a QoS requirement of serving traffic, UE capabilities of the UE, a power constraint associated with the UE, and/or a propagation delay associated with an access link of the UE, among other examples.

In some aspects, the network entity 705 may transmit, and one or more UEs (e.g., the UE 120, the relay UE 120, the different relay UE 120, and/or one or more other UEs) may receive an indication to activate or to deactivate operations relating to relay UE switching after beam failure, as described herein. In some aspects, the network entity 705 may transmit the indication in a MAC-CE or in downlink control information. In some aspects, a UE may transmit, and the network entity 705 may receive, a request to activate or to deactivate operations relating to relay UE switching after beam failure, as described herein. The network entity 705 may respond to the request with the indication to activate or to deactivate. In some aspects, the UE may transmit the request in a MAC-CE or in uplink control information. The network entity 705 may transmit the indication to activate or to deactivate and/or the UE may transmit the request to activate or to deactivate based at least in part on an availability of neighboring relay UEs for the UE, a QoS requirement of serving traffic, a power constraint associated with the UE, a capacity constraint associated with the UE, and/or a UE capability constraint associated with the UE, among other examples.

As indicated above, FIG. 7 is provided as an example. Other examples may differ from what is described with respect to FIG. 7.

Figure 8:
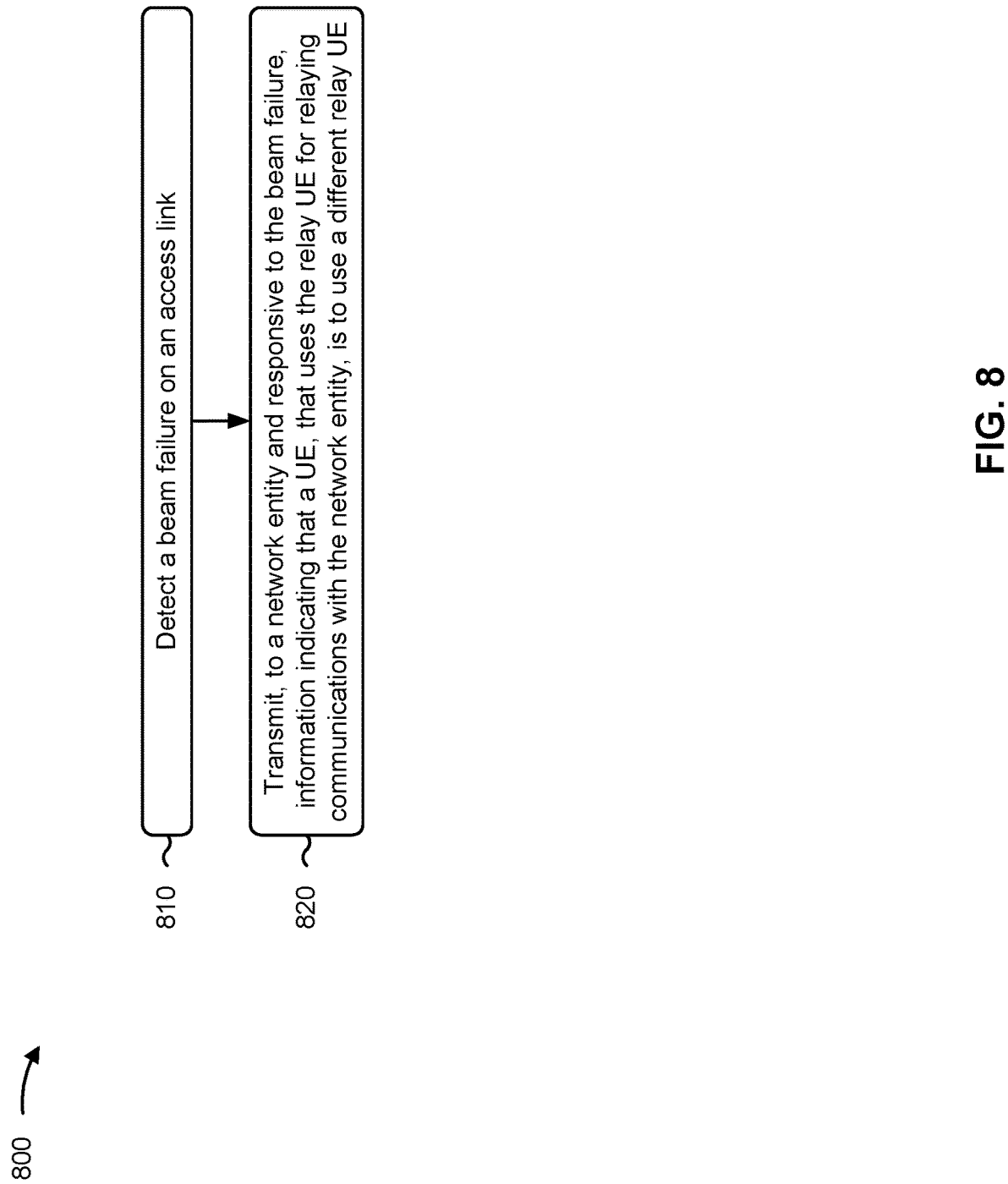
FIGS. 8-9 are diagrams illustrating example processes associated with relay UE switching, in accordance with the present disclosure.

FIG. 8 is a diagram illustrating an example process 800 performed, for example, by a relay UE, in accordance with the present disclosure. Example process 800 is an example where the relay UE (e.g., the UE 120) performs operations associated with relay UE switching after beam failure.

As shown in FIG. 8, in some aspects, process 800 may include detecting a beam failure on an access link (block 810). For example, the relay UE (e.g., using communication manager 140 and/or detection component 1008, depicted in FIG. 10) may detect a beam failure on an access link, as described above.

As further shown in FIG. 8, in some aspects, process 800 may include transmitting, to a network entity and responsive to the beam failure, information indicating that a UE, that uses the relay UE for relaying communications with the network entity, is to use a different relay UE (block 820). For example, the relay UE (e.g., using communication manager 140 and/or transmission component 1004, depicted in FIG. 10) may transmit, to a network entity and responsive to the beam failure, information indicating that a UE, that uses the relay UE for relaying communications with the network entity, is to use a different relay UE, as described above.

Process 800 may include additional aspects, such as any single aspect or any combination of aspects described below and/or in connection with one or more other processes described elsewhere herein.

In a first aspect, the information is in a beam failure recovery message.

In a second aspect, alone or in combination with the first aspect, the information is in a MAC-CE or uplink control information.

In a third aspect, alone or in combination with one or more of the first and second aspects, the information further indicates an identity of the UE.

In a fourth aspect, alone or in combination with one or more of the first through third aspects, the information further indicates a recommendation of the different relay UE for the UE.

Figure 10:
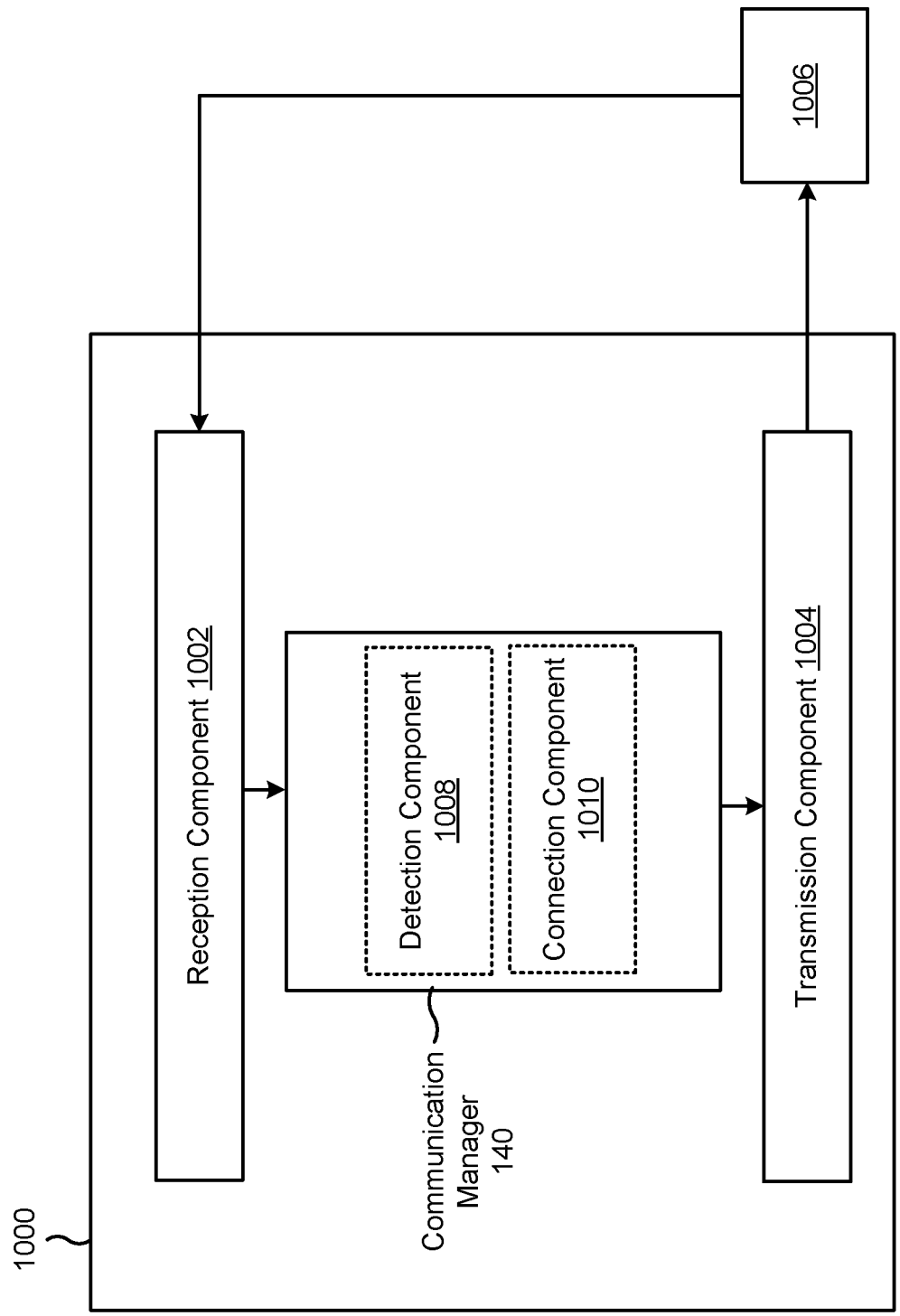
FIGS. 10-11 are diagrams of example apparatuses for wireless communication, in accordance with the present disclosure.

In a fifth aspect, alone or in combination with one or more of the first through fourth aspects, process 800 includes receiving (e.g., using communication manager 140 and/or reception component 1002, depicted in FIG. 10) an indication of a timer for switching relaying for the UE from the different relay UE to the relay UE.

In a sixth aspect, alone or in combination with one or more of the first through fifth aspects, the indication is in a beam failure recovery response message.

In a seventh aspect, alone or in combination with one or more of the first through sixth aspects, process 800 includes resuming (e.g., using communication manager 140 and/or connection component 1010, depicted in FIG. 10) a sidelink connection with the UE, for relaying communications of the UE, at an expiration of the timer.

In an eighth aspect, alone or in combination with one or more of the first through seventh aspects, process 800 includes performing (e.g., using communication manager 140, reception component 1002, and/or transmission component 1004, depicted in FIG. 10) one or more operations of a beam failure recovery procedure for the access link.

In a ninth aspect, alone or in combination with one or more of the first through eighth aspects, process 800 includes receiving (e.g., using communication manager 140 and/or reception component 1002, depicted in FIG. 10) an indication that relaying for the UE is to switch from the different relay UE to the relay UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
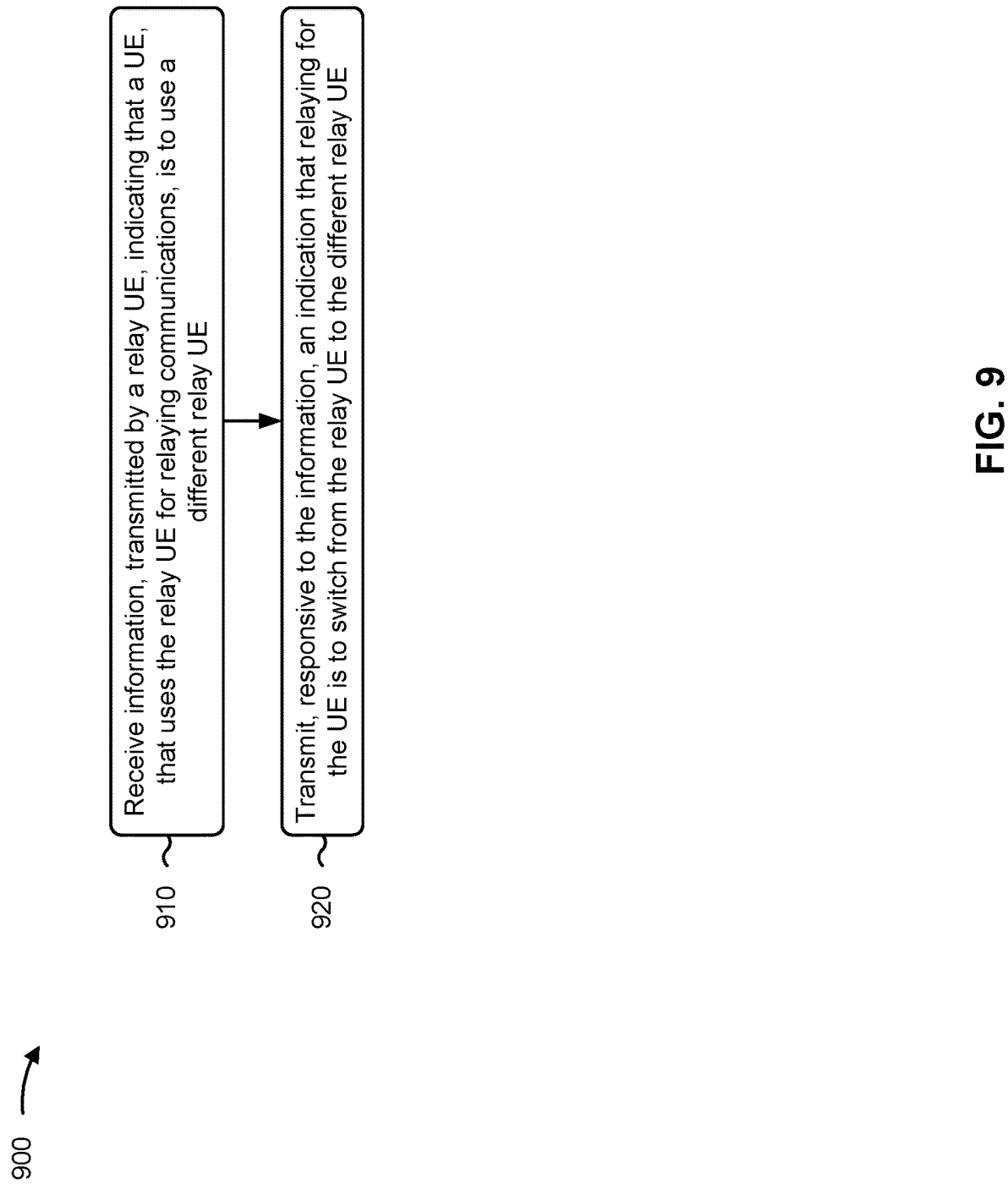

FIG. 9 is a diagram illustrating an example process 900 performed, for example, by a network entity, in accordance with the present disclosure. Example process 900 is an example where the network entity (e.g., network entity 705) performs operations associated with relay UE switching after beam failure.

As shown in FIG. 9, in some aspects, process 900 may include receiving information, transmitted by a relay UE, indicating that a UE, that uses the relay UE for relaying communications, is to use a different relay UE (block 910). For example, the network entity (e.g., using communication manager 1108 and/or reception component 1102, depicted in FIG. 11) may receive information, transmitted by a relay UE, indicating that a UE, that uses the relay UE for relaying communications, is to use a different relay UE, as described above.

As further shown in FIG. 9, in some aspects, process 900 may include transmitting, responsive to the information, an indication that relaying for the UE is to switch from the relay UE to the different relay UE (block 920). For example, the network entity (e.g., using communication manager 1108 and/or transmission component 1104, depicted in FIG. 11) may transmit, responsive to the information, an indication that relaying for the UE is to switch from the relay UE to the different relay UE, as described above.

Process 900 may include additional aspects, such as any single aspect or any combination of aspects described below and/or in connection with one or more other processes described elsewhere herein.

In a first aspect, the information is in a beam failure recovery message.

In a second aspect, alone or in combination with the first aspect, the information is in a MAC-CE or uplink control information.

In a third aspect, alone or in combination with one or more of the first and second aspects, the information further indicates an identity of the UE.

In a fourth aspect, alone or in combination with one or more of the first through third aspects, the information further indicates a recommendation of the different relay UE for the UE.

In a fifth aspect, alone or in combination with one or more of the first through fourth aspects, the indication is in a MAC-CE or downlink control information.

In a sixth aspect, alone or in combination with one or more of the first through fifth aspects, the different UE is recommended by the relay UE or is selected by the network entity based at least in part on sidelink measurement reporting.

In a seventh aspect, alone or in combination with one or more of the first through sixth aspects, the indication further indicates a timer for switching relaying for the UE from the different relay UE to the relay UE.

Figure 11:
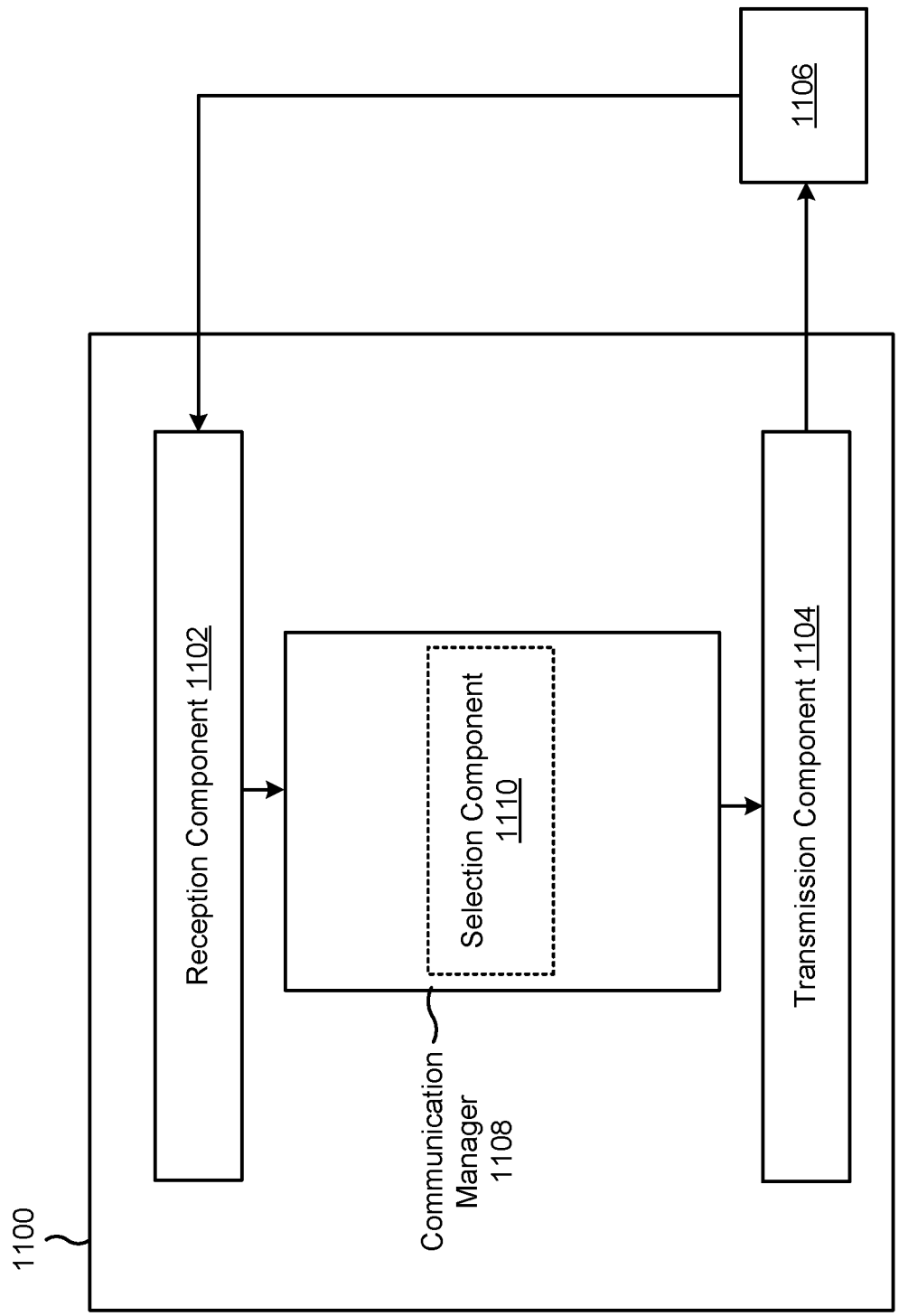

In an eighth aspect, alone or in combination with one or more of the first through seventh aspects, process 900 includes transmitting (e.g., using communication manager 1108 and/or transmission component 1104, depicted in FIG. 11), for the relay UE, an additional indication of a timer for switching relaying for the UE from the different relay UE to the relay UE.

In a ninth aspect, alone or in combination with one or more of the first through eighth aspects, the additional indication is in a beam failure recovery response message.

In a tenth aspect, alone or in combination with one or more of the first through ninth aspects, process 900 includes performing (e.g., using communication manager 1108, reception component 1102, and/or transmission component 1104, depicted in FIG. 11) one or more operations of a beam failure recovery procedure for an access link with the relay UE.

In an eleventh aspect, alone or in combination with one or more of the first through tenth aspects, process 900 includes transmitting (e.g., using communication manager 1108 and/or transmission component 1104, depicted in FIG. 11) an additional indication that relaying for the UE is to switch from the different relay UE to the relay UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a detection component 1008 or a connection component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The detection component 1008 may detect a beam failure on an access link. The transmission component 1004 may transmit, to a network entity and responsive to the beam failure, information indicating that a UE, that uses the relay UE for relaying communications with the network entity, is to use a different relay UE.

The reception component 1002 may receive an indication of a timer for switching relaying for the UE from the different relay UE to the relay UE. The connection component 1010 may resume a sidelink connection with the UE, for relaying communications of the UE, at an expiration of the timer. The reception component 1002 and/or the transmission component 1004 may perform one or more operations of a beam failure recovery procedure for the access link. The reception component 1002 may receive an indication that relaying for the UE is to switch from the different relay UE to the relay UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may be, may include, may be included in, or may be similar to, the communication manager 150. The communication manager 1108 may include a selection component 1110, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The reception component 1102 may receive information, transmitted by a relay UE, indicating that a UE, that uses the relay UE for relaying communications, is to use a different relay UE. The transmission component 1104 may transmit, responsive to the information, an indication that relaying for the UE is to switch from the relay UE to the different relay UE.

The transmission component 1104 may transmit, for the relay UE, an additional indication of a timer for switching relaying for the UE from the different relay UE to the relay UE. The reception component 1102 and/or the transmission component 1104 may perform one or more operations of a beam failure recovery procedure for an access link with the relay UE. The transmission component 1104 may transmit an additional indication that relaying for the UE is to switch from the different relay UE to the relay UE. The selection component 1110 may select the different relay UE for relaying for the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a relay user equipment (UE), comprising: detecting a beam failure on an access link; and transmitting, to a network entity and responsive to the beam failure, information indicating that a UE, that uses the relay UE for relaying communications with the network entity, is to use a different relay UE.

Aspect 2: The method of Aspect 1, wherein the information is in a beam failure recovery message.

Aspect 3: The method of Aspect 1, wherein the information is in a medium access control control element (MAC-CE) or uplink control information.

Aspect 4: The method of any of Aspects 1-3, wherein the information further indicates an identity of the UE.

Aspect 5: The method of any of Aspects 1-4, wherein the information further indicates a recommendation of the different relay UE for the UE.

Aspect 6: The method of any of Aspects 1-5, further comprising: receiving an indication of a timer for switching relaying for the UE from the different relay UE to the relay UE.

Aspect 7: The method of Aspect 6, wherein the indication is in a beam failure recovery response message.

Aspect 8: The method of any of Aspects 6-7, further comprising: resuming a sidelink connection with the UE, for relaying communications of the UE, at an expiration of the timer.

Aspect 9: The method of any of Aspects 1-8, further comprising: performing one or more operations of a beam failure recovery procedure for the access link.

Aspect 10: The method of any of Aspects 1-9, further comprising: receiving an indication that relaying for the UE is to switch from the different relay UE to the relay UE.

Aspect 11: A method of wireless communication performed by a network entity, comprising: receiving information, transmitted by a relay user equipment (UE), indicating that a UE, that uses the relay UE for relaying communications, is to use a different relay UE; and transmitting, responsive to the information, an indication that relaying for the UE is to switch from the relay UE to the different relay UE.

Aspect 12: The method of Aspect 11, wherein the information is in a beam failure recovery message.

Aspect 13: The method of Aspect 11, wherein the information is in a medium access control control element (MAC-CE) or uplink control information.

Aspect 14: The method of any of Aspects 11-13, wherein the information further indicates an identity of the UE.

Aspect 15: The method of any of Aspects 11-14, wherein the information further indicates a recommendation of the different relay UE for the UE.

Aspect 16: The method of any of Aspects 11-15, wherein the indication is in a medium access control control element (MAC-CE) or downlink control information.

Aspect 17: The method of any of Aspects 11-16, wherein the different UE is recommended by the relay UE or is selected by the network entity based at least in part on sidelink measurement reporting.

Aspect 18: The method of any of Aspects 11-17, wherein the indication further indicates a timer for switching relaying for the UE from the different relay UE to the relay UE.

Aspect 19: The method of any of Aspects 11-18, further comprising:
transmitting, for the relay UE, an additional indication of a timer for switching relaying for the UE from the different relay UE to the relay UE.

Aspect 20: The method of Aspect 19, wherein the additional indication is in a beam failure recovery response message.

Aspect 21: The method of any of Aspects 11-20, further comprising:
performing one or more operations of a beam failure recovery procedure for an access link with the relay UE.

Aspect 22: The method of any of Aspects 11-21, further comprising:
transmitting an additional indication that relaying for the UE is to switch from the different relay UE to the relay UE.

Aspect 23: An apparatus for wireless communication at a device, comprising a processor; memory coupled with the processor; and instructions stored in the memory and executable by the processor to cause the apparatus to perform the method of one or more of Aspects 1-10.

Aspect 24: A device for wireless communication, comprising a memory and one or more processors coupled to the memory, the one or more processors configured to perform the method of one or more of Aspects 1-10.

Aspect 25: An apparatus for wireless communication, comprising at least one means for performing the method of one or more of Aspects 1-10.

Aspect 26: A non-transitory computer-readable medium storing code for wireless communication, the code comprising instructions executable by a processor to perform the method of one or more of Aspects 1-10.

Aspect 27: A non-transitory computer-readable medium storing a set of instructions for wireless communication, the set of instructions comprising one or more instructions that, when executed by one or more processors of a device, cause the device to perform the method of one or more of Aspects 1-10.

Aspect 28: An apparatus for wireless communication at a device, comprising a processor; memory coupled with the processor; and instructions stored in the memory and executable by the processor to cause the apparatus to perform the method of one or more of Aspects 11-22.

Aspect 29: A device for wireless communication, comprising a memory and one or more processors coupled to the memory, the one or more processors configured to perform the method of one or more of Aspects 11-22.

Aspect 30: An apparatus for wireless communication, comprising at least one means for performing the method of one or more of Aspects 11-22.

Aspect 31: A non-transitory computer-readable medium storing code for wireless communication, the code comprising instructions executable by a processor to perform the method of one or more of Aspects 11-22.

Aspect 32: A non-transitory computer-readable medium storing a set of instructions for wireless communication, the set of instructions comprising one or more instructions that, when executed by one or more processors of a device, cause the device to perform the method of one or more of Aspects 11-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a relay user equipment (UE), comprising:
   a memory; and
   one or more processors, coupled to the memory, configured to:
      detect a beam failure on an access link;
      transmit, to a network entity and responsive to the beam failure, information indicating that a UE, that uses the relay UE for relaying communications with the network entity, is to use a different relay UE; and
      receive an indication of a timer for switching relaying for the UE from the different relay UE to the relay UE, a time value for the timer corresponding to a propagation delay associated with the access link.

2. The apparatus of claim 1, wherein the information is in a beam failure recovery message.

3. The apparatus of claim 1, wherein the information is in a medium access control control element (MAC-CE) or uplink control information.

4. The apparatus of claim 1, wherein the information further indicates an identity of the UE.

5. The apparatus of claim 1, wherein the information further indicates a recommendation of the different relay UE for the UE.

6. The apparatus of claim 1, wherein the indication is in a beam failure recovery response message.

7. The apparatus of claim 1, wherein the one or more processors are further configured to:
   resume a sidelink connection with the UE, for relaying communications of the UE, at an expiration of the timer.

8. The apparatus of claim 1, wherein the one or more processors are further configured to:
   perform one or more operations of a beam failure recovery procedure for the access link.

9. The apparatus of claim 1, wherein the one or more processors are further configured to:
   receive an indication that relaying for the UE is to switch from the different relay UE to the relay UE.

10. An apparatus for wireless communication at a network entity, comprising:
    a memory; and
    one or more processors, coupled to the memory, configured to:
       receive information, transmitted by a relay user equipment (UE), indicating that a UE, that uses the relay UE for relaying communications, is to use a different relay UE; and
       transmit, responsive to the information, an indication that relaying for the UE is to switch from the relay UE to the different relay UE, the indication indicating a timer for switching relaying for the UE from the different relay UE to the relay UE, a time value for the timer corresponding to a propagation delay associated with an access link of the relay UE.

11. The apparatus of claim 10, wherein the information is in a beam failure recovery message.

12. The apparatus of claim 10, wherein the information is in a medium access control control element (MAC-CE) or uplink control information.

13. The apparatus of claim 10, wherein the information further indicates an identity of the UE.

14. The apparatus of claim 10, wherein the information further indicates a recommendation of the different relay UE for the UE.

15. The apparatus of claim 10, wherein the indication is in a medium access control control element (MAC-CE) or downlink control information.

16. The apparatus of claim 10, wherein the different UE is recommended by the relay UE or is selected by the network entity based at least in part on sidelink measurement reporting.

17. The apparatus of claim 10, wherein the one or more processors are further configured to:
    transmit, for the relay UE, an additional indication of the timer.

18. The apparatus of claim 17, wherein the additional indication is in a beam failure recovery response message.

19. The apparatus of claim 10, wherein the one or more processors are further configured to:
    perform one or more operations of a beam failure recovery procedure for the access link with the relay UE.

20. The apparatus of claim 10, wherein the one or more processors are further configured to:
    transmit an additional indication that relaying for the UE is to switch from the different relay UE to the relay UE.

21. A method of wireless communication performed by an apparatus of a relay user equipment (UE), comprising:
    detecting a beam failure on an access link;
    transmitting, to a network entity and responsive to the beam failure, information indicating that a UE, that uses the relay UE for relaying communications with the network entity, is to use a different relay UE; and
    receiving an indication of a timer for switching relaying for the UE from the different relay UE to the relay UE, a time value for the timer corresponding to a propagation delay associated with the access link.

22. The method of claim 21, further comprising:
    resuming a sidelink connection with the UE, for relaying communications of the UE, at an expiration of the timer.

23. The method of claim 21, further comprising:
    receiving an indication that relaying for the UE is to switch from the different relay UE to the relay UE.

24. A method of wireless communication performed by a network entity, comprising:

receiving information, transmitted by a relay user equipment (UE), indicating that a UE, that uses the relay UE for relaying communications, is to use a different relay UE; and transmitting, responsive to the information, an indication that relaying for the UE is to switch from the relay UE to the different relay UE, the indication indicating a timer for switching relaying for the UE from the different relay UE to the relay UE, a time value for the timer corresponding to a propagation delay associated with an access link of the relay UE.

25. The method of claim 24, further comprising:

transmitting, for the relay UE, an additional indication of the timer.

26. The method of claim 24, further comprising:

transmitting an additional indication that relaying for the UE is to switch from the different relay UE to the relay UE.

27. The method of claim 24, wherein the indication is in a medium access control control element (MAC-CE) or downlink control information.

28. The method of claim 24, wherein the information is in a medium access control control element (MAC-CE) or uplink control information.

29. The method of claim 24, further comprising:

performing one or more operations of a beam failure recovery procedure for the access link with the relay UE.

30. The method of claim 29, wherein the time value for the timer is determined in accordance with a processing time corresponding to the beam failure recovery procedure.

* * * * *